UNITED STATES PATENT OFFICE.

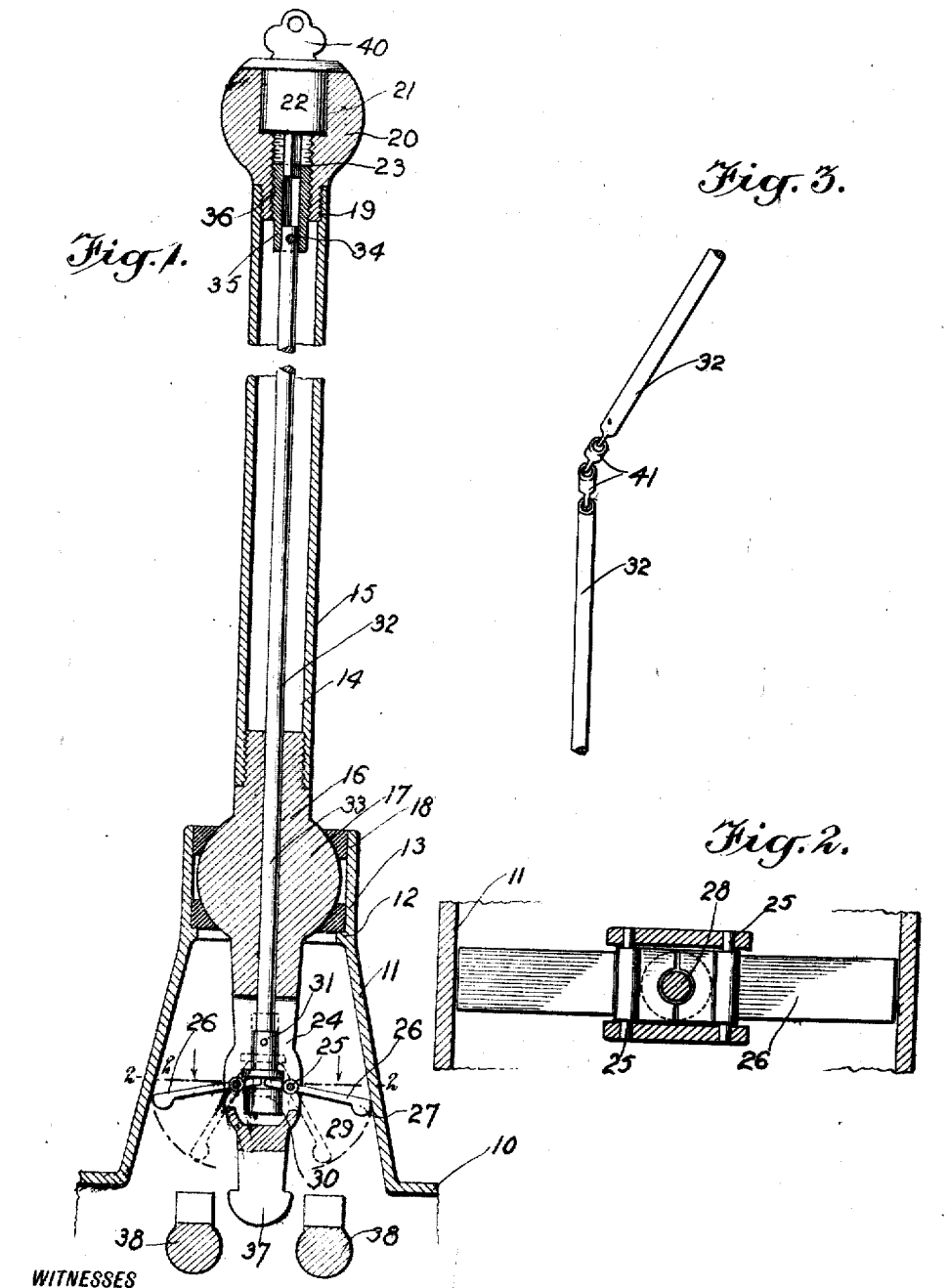

ARTHUR C. CURRAN, OF BROOKLYN, NEW YORK.

LOCK FOR GEAR-SHIFT LEVERS.

1,321,012.      Specification of Letters Patent.      Patented Nov. 4, 1919.

Application filed March 10, 1919. Serial No. 281,677.

*To all whom it may concern:*

Be it known that I, ARTHUR C. CURRAN, a citizen of the United States, and a resident of the city of New York, borough of Brooklyn, in the county of Kings and State of New York, have invented a new and Improved Lock for Gear-Shift Levers, of which the following is a full, clear, and exact description.

The present invention relates to new and useful improvements in gear shifting mechanisms, and pertains more particularly to means for locking the same.

The primary object of the invention is to provide means whereby the operating member of a motor vehicle transmission may be effectively locked against operation by unauthorized persons.

A further object of the invention is to so construct a device of this character that it is applicable to the ordinary transmission shifting device at present in use with very slight changes in the construction thereof.

With the above and other objects in view which will appear as the nature of the invention is understood, reference is had to the accompanying drawings in which—

Figure 1 is a longitudinal sectional view of a gear shift lever and its mounting in the transmission casing;

Fig. 2 is a transverse sectional view on the line 2—2 of Fig. 1;

Fig. 3 is a detail view of a modification.

Referring more particularly to the drawings, the reference character 10 designates a transmission housing, and 11 designates a vertically extending tapered portion thereof. The vertically extending tapered portion 11 is provided, near its upper end, with an internal annular flange 12, which supports a circular bearing member 13. Mounted on the circular bearing member 13, is a gear shift lever 14, which comprises a tubular section 15 and a solid section 16, said solid section 16 being provided intermediate of its ends, with an enlarged spherical portion 17. The lower portion of this spherical member 17 is adapted to engage the bearing member 13. Maintaining said spherical member 17 in engagement with the bearing member 13, is a bearing member 18. These bearing members 13 and 18 may be secured in the upper end of the tapering portion 11 in any desired manner.

The upper end of the tubular section 15 is provided with internal screw threads 19, and having threaded engagement therewith is an operating knob or handle 20. This operating knob or handle 20 is cut out, as at 21, for the reception of a key-actuated lock 22, and projecting downwardly from the lock 22, there is a squared shaft 23, the purpose of which will be hereinafter described.

The lower portion of the solid section 16 is cut out, as at 24, and pivotally secured in the opposite side walls of said cut-out portion 24, as by means of pins or stub shafts 25, are two oppositely disposed swinging arms 26. The outer end of each of these arms 26 is enlarged, as at 27, for a purpose to be hereinafter described, and the inner ends of said arms are cut out, as at 28, in order that they may receive the channel 29 of a hub member 30. This head member 30 is secured by means of a key 31, to the lower end of a shaft 32, which extends through a passage 33, in the solid section 16, and upwardly through the tubular section 15. Secured to the upper end of the shaft 32, as by means of a key 34, is a sleeve 35, the upper end of which is squared and is adapted to receive the squared shaft 23 of the lock 22, as shown in Fig. 1.

The sleeve 35 has a screw-threaded exterior and is adapted to be engaged with a screw thread 36 in the operating knob or handle 20. The lower extremity 37 of the solid member 13 is adapted to be engaged with the common form of gear shifting mechanism 38, which, however, forms no part of the present invention and is therefore not shown.

The operation of the device is as follows: When it is desired to lock the gear shift lever 14 against movement and in the neutral position which is shown in Fig. 1, the key 40 is inserted in the lock 22, and said key is turned. This turning of the key rotates the squared shaft 23 and in turn the screw-threaded sleeve 35. Upon rotation of the sleeve 35, the same will be moved longitudinally of the operating knob or handle 20, thus moving the shaft 32 longitudinally of the lever 14. This movement of the shaft 32 throws the pivoted levers 26 from the dotted-line position shown in Fig. 1, to the full-line position shown in Fig. 1, in which latter position they engage the inner face of the portion 11 of the transmission housing.

With the parts in the above outlined positions, it will be seen that the lever 14 is secured against lateral movement, and, therefore, its lower extremity 37 cannot be moved into engagement with either of the gear shifting mechanisms 38.

When it is desired to use the gear shift lever 14, the key 40 is again inserted and turned to rotate the squared shaft 23 in the opposite direction to that above described. This movement of the shaft 23 retracts the shaft 32, thus swinging the pivoted levers 26 to the dotted-line position in Fig. 1. The enlarged portion 27 of the levers 26 gives added weight thereto on their extreme outer ends and aids in the lowering of the said levers to the dotted-line position as shown.

In some forms of gear shift levers, the upper portion of the lever is offset with relation to the enlarged portion 17 thereof, and in that type of lever, a shaft 32, such as shown in Fig. 3, is employed, said shaft being in two or more sections, which are connected together by means of universal joints or the like 41. These universal-joints 41 permit of a movement of the shaft 32 longitudinally of the gear shift lever 14, when the upper portion thereof is offset relatively to the pivotal mounting of said lever.

In view of the foregoing, it will be apparent that the present invention provides means by which the unauthorized tampering with the motor vehicle to which the device may be applied, is prevented.

While I have shown the preferred from of the present invention, it is to be understood that such changes and modifications as may fall within the scope of the appended claims may be made without departing from the spirit of the invention.

Having thus described the invention, what is claimed as new, is:

1. A device of the character described comprising in combination with a gear shift lever and its support, means carried by said lever and pivotally secured thereto for engagement with said support, and means movable longitudinally of the lever for operating said support-engaging means.

2. A device of the character described comprising in combination with a gear shift lever and its housing, a plurality of members pivotally carried by said lever, and means movable longitudinally of said lever for causing engagement of the free ends of said pivoted members with said housing to prevent lateral movement of the said lever.

3. A device of the character described comprising in combination with a transmission housing, a gear shift lever pivotally mounted in said housing and having a cut-out portion in its lower end, a pair of radially swinging levers pivotally secured in said cut-out portion and adapted for movement into engagement with said housing, and means movable longitudinally of said lever for operating said swinging levers.

4. A device of the character described comprising in combination with a transmission housing, a gear shift lever pivotally mounted in said housing and having a cut-out portion in its lower end, a plurality of swinging arms pivotally carried by the lower end of said lever and adapted for movement into engagement with the inner face of said transmission housing, a shaft movable longitudinally of the gear shift lever for operating said swinging members, and means carried by the free end of said gear shift lever for operating said shaft.

5. A device of the character described comprising in combination with a transmission housing, a gear shift lever mounted for universal movement in said housing, a plurality of swinging arms pivotally carried by said gear shift lever and adapted for movement into engagement with a portion of the transmission housing, a shaft movable longitudinally of the gear shift lever and adapted to operate said swinging arms, a rotating sleeve movable longitudinally of said gear shift lever and connected to said shaft, and means for rotating said sleeve.

6. A device of the character described comprising in combination with a gear shift lever and its housing, a plurality of members pivotally carried by said lever, and means for causing engagement of the free ends of said pivoted members with said housing to prevent lateral movement of the lever.

7. A device of the character described comprising in combination with a suitable support, an operating lever pivoted intermediate of its ends to said support, means carried by said lever intermediate of one of its ends and its pivotal point for engagement with the support to prevent movement of said lever, and means for moving said support-engaging means into and out of operative position.

8. A device of the character described comprising in combination with a gear shift lever and its support, means carried by said lever between one of its ends and its pivotal point for engagement with said support to prevent movement of the lever, and means for moving said support-engaging means into and out of engagement with said support.

ARTHUR C. CURRAN.